United States Patent

Schafer

[15] 3,688,523
[45] Sept. 5, 1972

[54] ROTATING SEALING SLEEVE OF ELASTIC MATERIAL ESPECIALLY FOR DRIVING JOINTS OF MOTOR VEHICLES

[72] Inventor: Lutz Schafer, Suttgart-Bad Cannstatt, Germany

[73] Assignee: Daimler-Benz Aktiengesellschaft, Stuttgart-Unlerlurkheim, Germany

[22] Filed: Dec. 17, 1970

[21] Appl. No.: 99,091

[30] Foreign Application Priority Data

Dec. 17, 1969 Germany..........P 19 63 175.5

[52] U.S. Cl. ...................................64/32 F, 277/212
[51] Int. Cl. ..............................................F16d 3/84
[58] Field of Search ...........................64/32; 277/212

[56] References Cited

UNITED STATES PATENTS 2,825,213  3/1958  Dunn..........................64/32 F
3,511,061  5/1970  Burckhardt................64/32 F Primary Examiner—Edward G. Favors
Attorney—Craig & Antonelli

[57] ABSTRACT

A rotating sealing sleeve made from elastic material and intended in particular for drive joints of motor vehicles, which includes a collar of smaller diameter for the fastening at the shaft element and a collar of larger diameter for the fastening at the joint part; the collar area for the mounting of a clamping band includes outwardly a boundary collar and inwardly a relief groove which is adjoined inwardly by a further boundary collar; the width of the clamping band is thereby so selected in relation to the clamping area that the relief groove is at least partially covered thereby; the elastic sleeve may be of the type which includes a deformation part provided adjacent each collar area in the sleeve body which consists of one diaphragm part or of two diaphragm parts connected by a short spacer section; the two deformation parts are connected with each other by a relatively large and stiff spacer section.

14 Claims, 4 Drawing Figures

PATENTED SEP 5 1972　　　　　　　　　　　3,688,523

INVENTOR
LUTZ SCHÄFER

BY Craig, Antonelli, Stewart & Hill

ATTORNEYS

ROTATING SEALING SLEEVE OF ELASTIC MATERIAL ESPECIALLY FOR DRIVING JOINTS OF MOTOR VEHICLES

The present invention relates to a rotating sealing sleeve made from elastic material, intended in particular for drive joints of motor vehicles, with a collar of smaller diameter for the fastening at the shaft member and with a collar of larger diameter for the fastening at the joint part, and especially according to U.S. Pat. No. 3,511,061, to M. H. Burckhardt, assigned to the assignee of the present invention, with a deformation part provided in the sleeve body adjacent each collar place, which consists of one or two diaphragm parts disposed approximately normal to the axis and connected with each other by a short spacer section, whereby both deformation parts are in operative connection with each other by a relatively large and stiff spacer section.

Sealing sleeves of the type broadly described above are known in the most varied types of constructions. Frequently, the sleeve body consists of a rubber bellows formed saw-tooth-shaped in cross section, which includes two clamping places at its two ends. These prior art sleeve shapes and configurations, however, are unable to withstand in particular higher rotational speeds, but instead they rather tend to tearing in the sleeve body. Consequently, a sealing sleeve has been proposed in the aforementioned U.S. Pat. No. 3,511,061, which is constructed in the manner described in the patent and which no longer produces any tears in the sleeve body also at high rotational speeds. Nonetheless, with all of these described sleeve shapes, there still exists the difficulty that after some time, they tend frequently to incipient cracks or breaks or ruptures at the clamping place. This apparently is due to the fact that the clamping band cuts more or less into the full material at the clamping place and consequently these places form the starting point for such cracks and ruptures.

The present invention is concerned with the task to avoid the aforementioned disadvantages and to provide a sealing sleeve that no longer gives rise to any objections also at the clamping places. The underlying problems are solved for the types of sleeves mentioned hereinabove and especially for those types of sleeves described in the U.S. Pat. No. 3,511,061, in that at the collar place for the mounting of the clamping band, a boundary collar is arranged outwardly thereof (opposite the sleeve body) and a relief groove is arranged inwardly thereof (facing the sleeve body) which is also adjoined by a boundary collar, whereby the width of the clamping band is so selected that the relief groove is at least covered substantially.

In this manner, the clamping band can no longer cut into the solid material but instead the material is correspondingly set back at this place so that no cuts or tears can occur any longer thereat. As a result thereof, these types of sleeves in accordance with the present invention are also fully able to withstand higher rotational speeds during continuous operation.

A further feature of the present invention resides in the fact that the inner boundary collar is the thinner, the flatter the relief groove. Furthermore, the present invention can be further developed in that the abutment surface for the clamping band is constructed of undulated shape in longitudinal cross section. In this manner, a higher stress occurs during the tightening of the clamping band at the places of contact than at the endangered clamping band edges. This also counteracts the tearing and cracking at this edge. The relief groove can thereby be incorporated, so to speak of, in the undulated construction of the abutment surface whereby the present invention proposes that the relief groove is lower than the depth of the waves or undulations within this abutment area.

Accordingly, it is an object of the present invention to provide a sealing sleeve which avoids by simple means the aforementioned shortcomings and drawbacks encountered in the prior art.

Another object of the present invention resides in a rotating sealing sleeve made from elastic material, especially intended for drive joints of motor vehicles which are capable of operating satisfactorily at high speeds without the danger of cracking, tearing, or rupturing at the clamping places thereof.

These and further objects, features, and advantages of the present invention will become more apparent from the following description when taken in connection with the accompanying drawing which shows, for purposes of illustration only, several embodiments in accordance with the present invention, and wherein.

Figure 1:
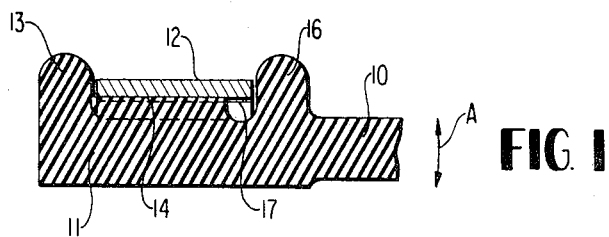
FIGS. 1 to 3 are partial longitudinal cross-sectional views through three different embodiments of the collar of a sealing sleeve in accordance with the present invention.

Referring now to the drawing wherein like reference numerals are used throughout the various views to designate like parts, and more particularly to FIG. 1, a sealing sleeve body 10 not illustrated in detail and of any conventional construction, such as shown, for example, in the U.S. Pat. No. 3,511,061—which is more or less deflected during operation in the direction of arrow A—terminates in a clamping place 11, by means of which it is secured at the joint part (not shown). A clamping band 12 of any conventional construction serves for the fastening, which abuts externally against a boundary collar 13 and which during tightening compresses the abutment surface 14 to approximately the position thereof indicated in dash line. A relief groove 17 is arranged inwardly adjacent the abutment surface 14 which in turn is adjoined by a further boundary collar 16.

The relief groove 17 is covered by the clamping band 12—which is wider than its abutment surface 14—so that the clamping band 12 can abut at both boundary collars 13 and 16.

Figure 2:
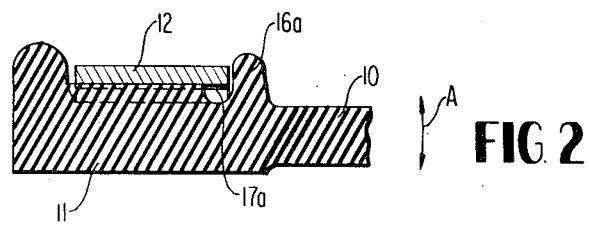

The construction according to FIG. 2 corresponds essentially to that according to FIG. 1. However, the relief groove 17a is now constructed somewhat flatter and the inner boundary rim 16a is correspondingly constructed also somewhat thinner.

Figure 3:
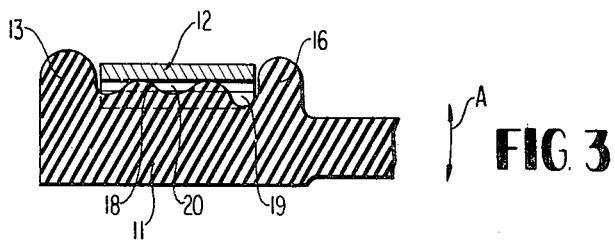

According to FIG. 3, the collar place 11 of the sleeve 10 is again provided on both sides with boundary collars 13 and 16. The abutment surface 18 for the clamping band 12 is now constructed of undulated or wave shape. This wave-shaped construction terminates directly in the relief groove 19 adjacent the boundary rim 16, which relief groove 19 has a considerably larger depth than corresponds to the depth of the undulations 20 at the abutment surface 18. During the tightening of the clamping band 12, the wave-shaped projections in the abutment surface 18 are compressed. As a result of the larger stresses produced thereby within the area of the abutment surface 18, the relief groove 19 can be kept flatter. The number of undulated projections within the area of the abutment surface 18 will be appropriately the larger the wider the abutment surface.

Figure 4:
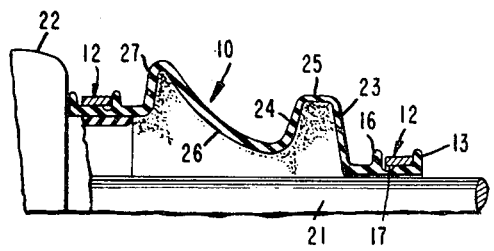
FIG. 4 is a partial cross-sectional view of a sealing sleeve in accordance with the present invention, arranged at a joint.

FIG. 4 shows a sealing sleeve 10 arranged at a drive joint of a motor vehicle, with a collar of a smaller diameter for the fastening at the shaft member 21 and with a collar of larger diameter for fastening at the joint part 22. As shown, the sleeve is provided with a deformation part provided in the sleeve body adjacent each collar place, which collar is similar to that of the FIG. 1 embodiment of the present invention. The deformation part consists of either two diaphragm parts 23 and 24 connected with each other by a short spacer section 25 shown adjacent the collar fastened to the shaft or a single diaphragm part 27, the diaphragm parts being disposed approximately normal to the axis of the sleeve. The diaphragm parts are in operative connection with each other by a relatively large and stiff spacer section 26.

While I have shown and described several embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. A rotating sealing sleeve with a sleeve body of elastic material which includes a collar means for the fastening at a respective part, characterized in that said collar means is provided within the collar area for the abutment of a clamping band, outwardly thereof with a boundary collar disposed opposite the sleeve body and inwardly thereof with a relief groove facing the sleeve body, said relief groove in turn being adjoined by a further boundary collar, the width of the clamping band being such that the relief groove is covered at least in part.

2. A sealing sleeve according to claim 1, characterized in that the inner boundary collar is the thinner the flatter the relief groove.

3. A sealing sleeve according to claim 2, characterized in that the abutment surface for the clamping band is of undulated shape in longitudinal cross section and in that the relief groove is deeper than the depth of the undulations in the abutment surface of the clamping band.

4. A sealing sleeve according to claim 1, characterized in that the abutment surface for the clamping band is of undulated shape in longitudinal cross section and in that the relief groove is deeper than the depth of the undulations in the abutment surface of the clamping band.

5. A rotating sealing sleeve made from elastic material with a collar of relatively smaller diameter for the fastening at a shaft element and with a collar of relatively larger diameter for the fastening at a joint part, which include deformation means adjacent each collar area, said deformation means including at least one diaphragm part disposed approximately perpendicular to the axis of the rotating sleeve, characterized in that a boundary collar is provided externally of a collar area for the mounting of a clamping band and in that a relief groove is provided inwardly of said collar area, another boundary collar adjoining said relief groove inwardly thereof, and in that the width of the clamping band is selected in such a manner that the relief groove is covered at least in part.

6. A sealing sleeve according to claim 5, characterized in that the deformation means consists of two diaphragm parts connected with each other by a spacer means.

7. A sealing sleeve according to claim 6, characterized in that the two deformation means adjacent the two collar areas are operatively connected with each other by a relatively large and stiff spacer means.

8. A sealing sleeve according to claim 7, characterized in that the sleeve seals the space between a drive joint and a drive shaft of a motor vehicle.

9. A sealing sleeve according to claim 8, characterized in that the inner boundary collar is the thinner the flatter the relief groove.

10. A sealing sleeve according to claim 8, characterized in that the abutment surface for the clamping band is of undulated shape in longitudinal cross section, and in that the relief groove is deeper than the depth of the undulations in the abutment surface of the clamping band.

11. A sealing sleeve according to claim 5, characterized in that the two deformation means adjacent the two collar areas are operatively connected with each other by a relatively large and stiff spacer means.

12. A sealing sleeve according to claim 5, characterized in that the sleeve seals the space between a drive joint and a drive shaft of a motor vehicle.

13. A sealing sleeve according to claim 5, characterized in that the inner boundary collar is the thinner the flatter the relief groove.

14. A sealing sleeve according to claim 5, characterized in that the abutment surface for the clamping band is of undulated shape in longitudinal cross section, and in that the relief groove is deeper than the depth of the undulations in the abutment surface of the clamping band.

* * * * *